United States Patent [19]

Strommer

[11] 3,883,676

[45] May 13, 1975

[54] METHOD FOR TEXTURIZING PARTICULATE PROTEIN MATERIAL

[75] Inventor: Palmer K. Strommer, Osseo, Minn.

[73] Assignee: General Mills, Inc., Minneapolis, Minn.

[22] Filed: Oct. 18, 1973

[21] Appl. No.: 407,750

[52] U.S. Cl. .............. 426/511; 426/507; 426/518
[51] Int. Cl. ............................................. A23j 3/00
[58] Field of Search ............ 426/506, 507, 511, 518

[56] References Cited
UNITED STATES PATENTS

| | | | |
|---|---|---|---|
| 3,730,729 | 5/1973 | Strommer | 426/511 X |
| 3,754,926 | 8/1973 | Strommer et al. | 426/511 |
| 3,778,522 | 12/1973 | Strommer | 426/511 |

*Primary Examiner*—James R. Hoffman
*Attorney, Agent, or Firm*—Anthony A. Juettner; Patrick J. Span; Norman P. Friederichs

[57] ABSTRACT

Method for texturing particulate protein material. The protein material is fed into an elongated treating chamber which is under pressure. The chamber has an inlet at one end and an outlet at the other end. An in-line or continuous cutter is provided within the elongated treating chamber. The protein material is fed into a flow of gaseous fluid from the direction of the inlet to propel the material through the elongated chamber and out of the outlet.

8 Claims, 8 Drawing Figures

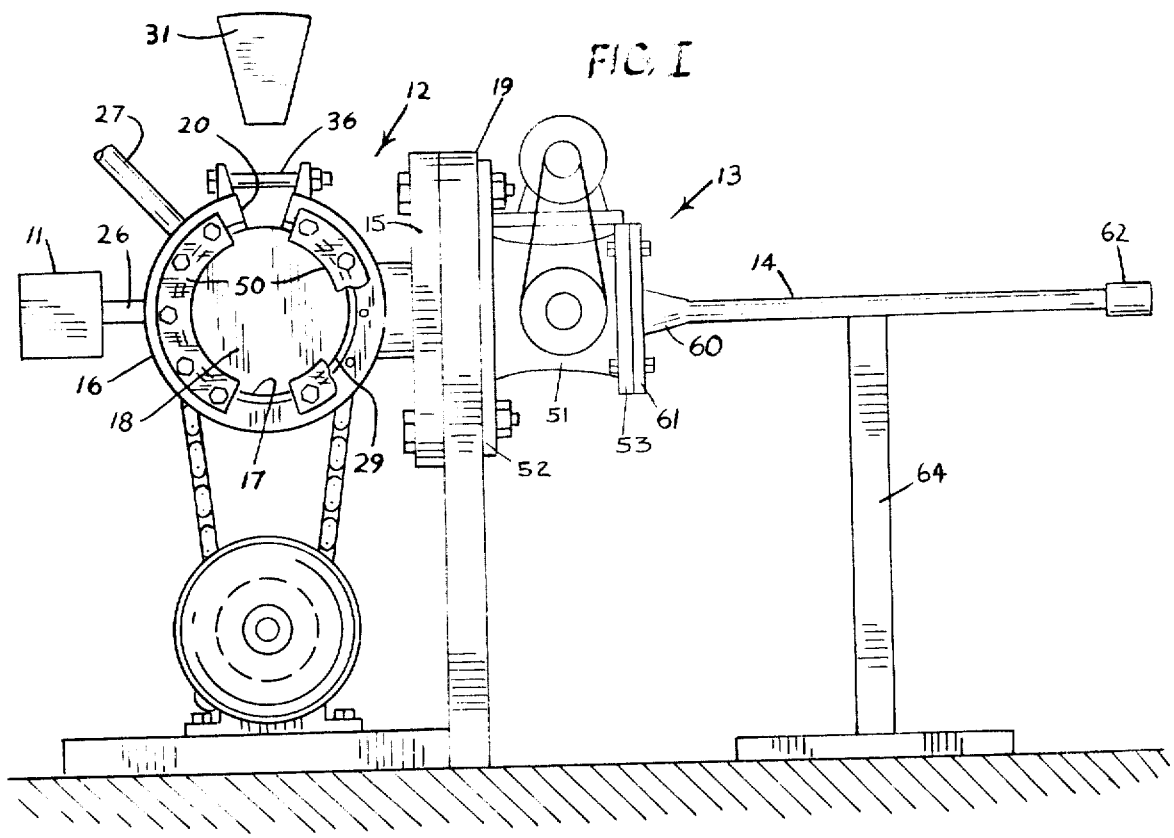
FIG. I
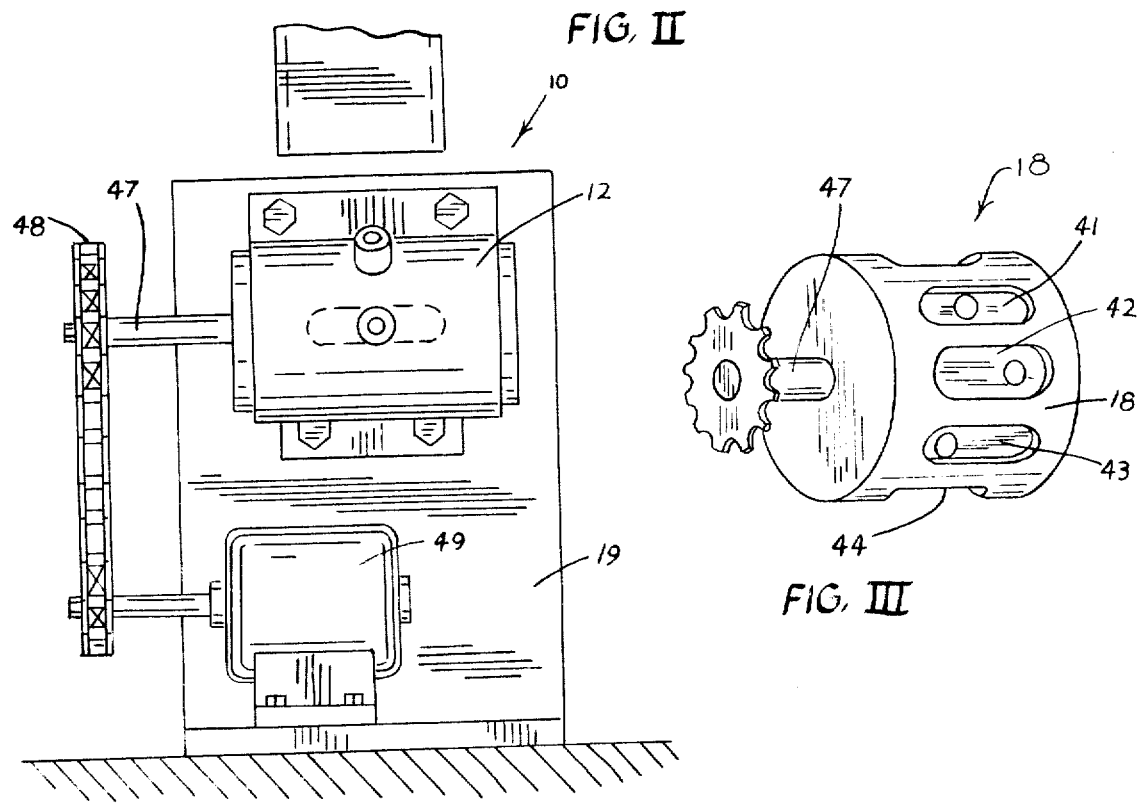
FIG. II
FIG. III

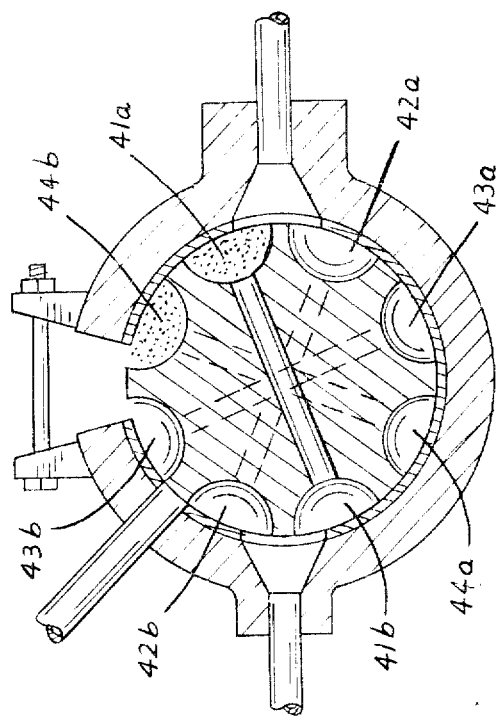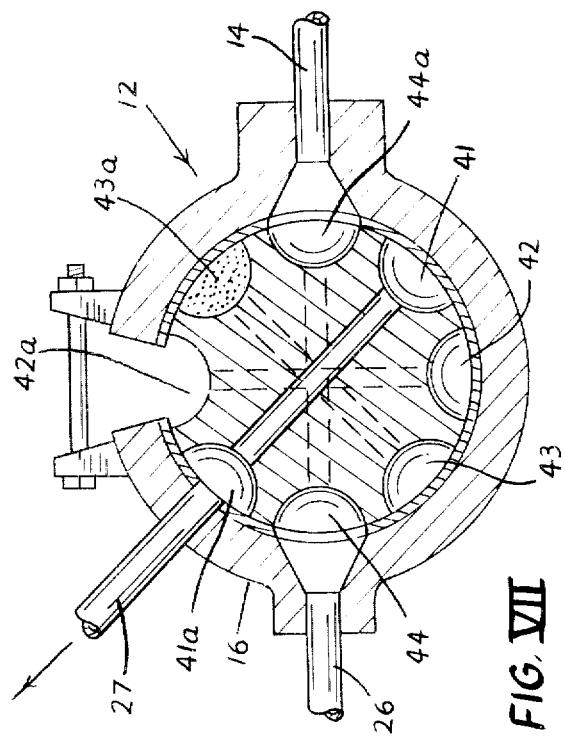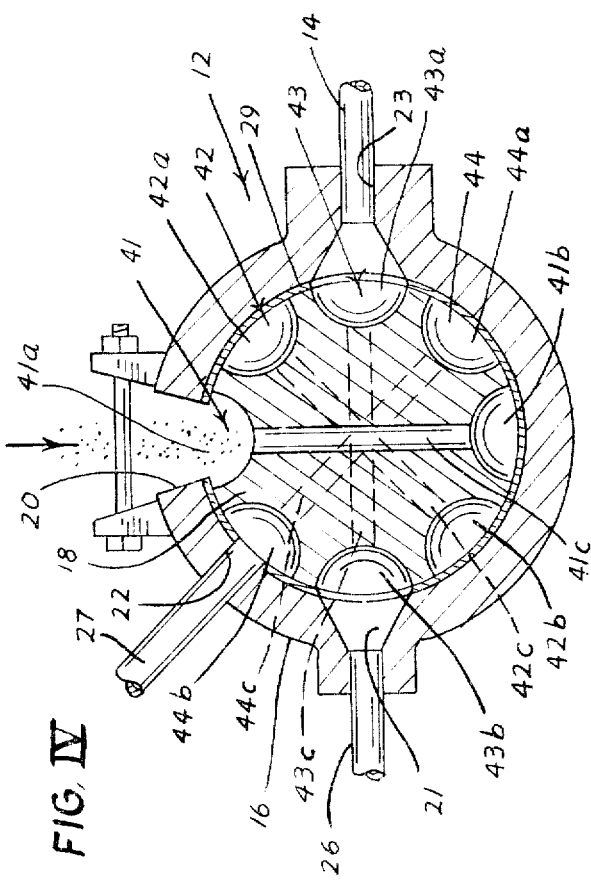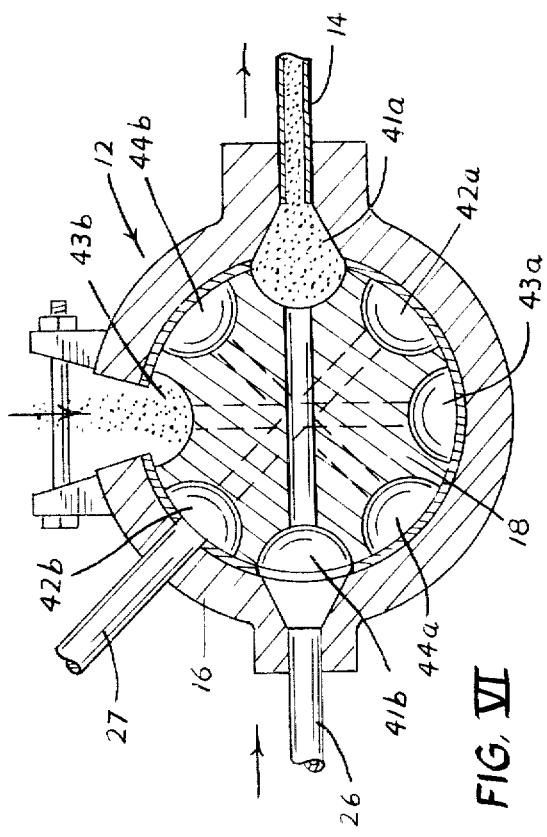

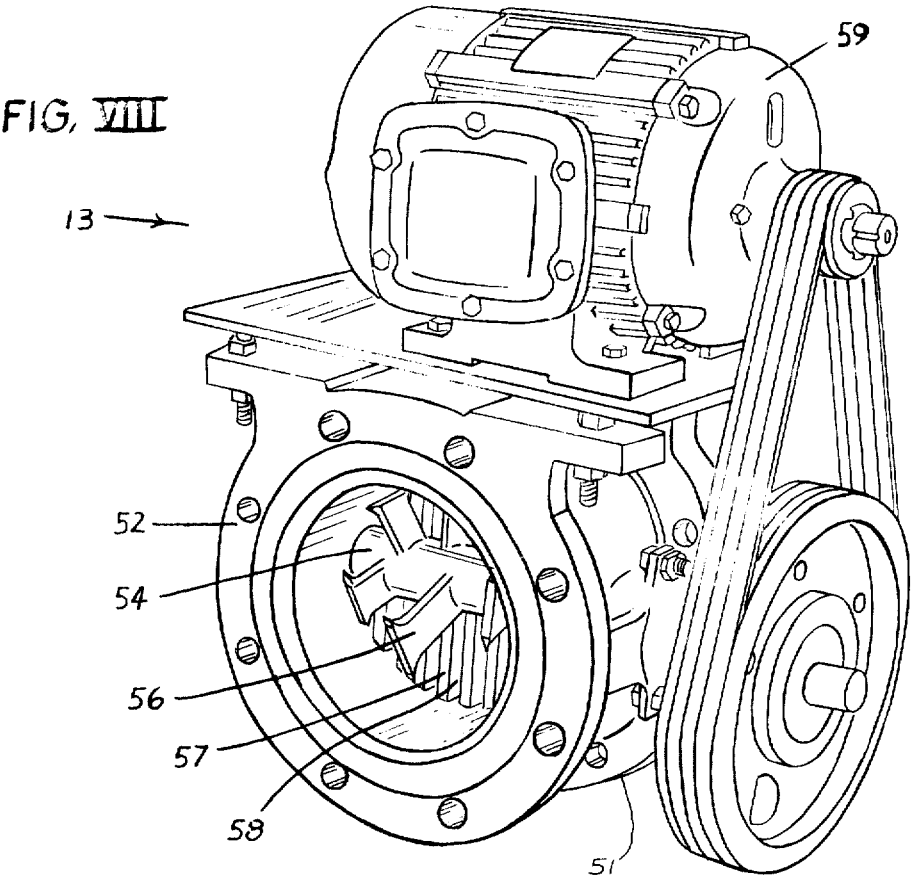
FIG. VIII

METHOD FOR TEXTURIZING PARTICULATE PROTEIN MATERIAL

BACKGROUND OF THE PRESENT INVENTION

The present invention relates to treating of food materials and more particularly to texturizing fine particulate protein food products.

In recent years substantial effort has been directed toward treating vegetable protein materials so as to provide such materials with texture and other characteristics commonly found in animal meat products. The vegetable protein materials are primarily soybean meal and flour, however, various other oil seed meals and flours also are used, such as peanut, cottonseed and sesame seed meals and flours. It is generally preferred to use protein concentrates of such oil seed meals, typically including at least about 50% protein by weight.

Various types of methods and apparatus have been used in the past to texturize the vegetable protein material. For example, solubilized soy protein has been extruded into an acid bath thereby forming texturized fibers. Untextured protein material contains protein in discrete particles. Texturization takes place when the protein acquires a substantially continuous phase. The texturized material, when moist, is somewhat tough or chewy much like meat. The term "texturizing" as used herein will refer to the process of changing the discrete particles of protein into chunks having continuous phase protein.

It was recently discovered that finely-divided particulate protein material may be texturized by passing the material in a stream of gaseous fluid through an elongated cylinder or pipe and applying elevated pressure and temperature. This recently discovered method and apparatus provides highly satisfactory texturized protein. Such method and apparatus is disclosed and claimed in U.S. Pat. No. 3,754,926. An improvement on such method is further disclosed in U.S. patent application, Ser. No. 391,431 filed Aug. 24, 1973. Such disclosures are incorporated herein by reference.

The present invention provides improved apparatus and method in which the texturized protein material is cut by an inline cutter while in the stream of gaseous fluid. The present invention provides several advantages over the previous apparatus and method. The present invention results in an improved product. The product, for example, has increased bite. Such improved characteristics are believed to be partially due to increased residence time resulting from the fact that the cutter momentarily stops or slows the movement of the product through the pipe or cylinder. Such improvement may also be due to a certain amount of stretching of the product during the cutting operation. A substantial improvement is also obtained in the rate at which product may be processed through the apparatus without plugging the apparatus. This is believed to be due to the fact that the product size is reduced and the cut pieces do not significantly fuse back together. This permits the product to move through the restricted outlet of the cylinder or pipe.

The protein material to be processed according to the present invention may be of the type used in previous texturizing processes. This typically includes the various defatted oil seed meals and flours such as soybean, peanut, cottonseed and sesame. Various other untextured protein materials such as wheat gluten, yeast, sodium caseinate and the like may be texturized according to the present invention. The untextured protein material is preferably a flour-like material, particularly soybean flour.

THE PRESENT INVENTION

Apparatus according to the present invention is shown in the drawings as follows:

FIG. I shows a side view of the apparatus with portions broken away.

FIG. II shows an end view of the apparatus.

FIG. III shows a portion of a valve of the apparatus.

FIGS. IV–VII show cross sectional views of the valve in various positions of operation.

FIG. VIII shows a perspective view of one type of cutter.

The texturizing apparatus 10 (FIG. I) may include a rotary valve 12, a cutter 13, and a pipe or tube 14. The texturizing apparatus 10 is connected to a high pressure fluid source 11, such as a steam boiler, which is capable of providing a fluid or steam pressure to the rotary valve 12 sufficient to texturize the protein material.

The rotary valve 12 includes a valve housing 16 with an opening or chamber 17 for reception of the rotary valve member or plug 18. The valve housing 16 has a base 15 for support of the valve 12 on bracket 19. The valve housing 16 has an upper opening 20 which serves as an inlet for protein material to be texturized. The housing 16 (FIG. IV) further includes openings 21 and 22 for reception of pipes 26, 27 respectively. The pipes, for example, may be threadedly engaged in said openings. The pipe 26 is connected to the steam source 11 and feeds the pressurized steam to the valve 12. Pipe 27 is an exhaust pipe which depressurizes any residual steam pressure in valve 12 prior to the feeding of protein material to the valve 12 through opening 20. Opening 23 is the outlet through which protein material leaves valve 12. A hopper 31 (FIG. I) may be provided for feeding protein material to opening 20 in valve 12. The housing 16 has a bearing member 29 located in chamber 17 for rotatable support of the valve member 18. The bearing member 29 extends substantially around chamber 17 except for suitable openings which cooperate with openings 20, 21, 22 and 23 in housing 16. The valve housing 16 has a tightening means such as a bolt or screw 36 for drawing the housing 16 and bearing 20 tightly against the rotary valve member 18 thereby providing a steam seal between bearing 29 and the rotary valve member 18. The bearing 29 may be constructed from a brass cylinder.

The rotary valve member 18 (FIGS. III–VII) may be of steel and may be constructed from a solid cylinder or alternatively it may be formed by casting. The member 18 is provided with any desired number of sets of material feeding or conveying chambers such as 41, 42, 43 and 44. The member 18 will have typically four, five or six of such sets. Each set includes a pair of pockets such as 41a and 41b, as well as an interconnecting passageway such as 41c. Set 42 includes pockets 42a, 42b and passageway 42a c. Set 43 includes pockets 43a, 43b and passageway 43c. Set 44 includes pockets 44a, 44b and passageway 44c. The rotary valve member 18 has a shaft 47 and a sprocket 48 for driven engagement with suitable power means such as motor 49 (FIG. I). The valve member 18 may be held in position in housing 16 by restraining plates, such as plate 50 which is secured to housing 16 by screws. The rotary valve member alternatively may be as disclosed in U.S. Pat. No. 3,754,926.

The cutter 13 has a housing 51 which may be formed by casting. The housing 51 has a pair of flanges 52, 53, one being located at either end of the housing 51. The cutter 13 may include a rotatable shaft 54 which carries a plurality of cutting blades 56. The cutter 13 may have a cutting plate 57 with a plurality of slots 58 therein through which the cutting blades 56 may travel. The cutter 13 may be suitably driven such as by an electric motor 59 with drive belt and pulleys. The cutter 13 may be mounted on the bracket 19 by bolting of flange 52 to bracket 19. One type of cutter that has been found satisfactory is the Delumper DSC Multi-Action Processor (produced by Franklin Miller, Inc. of East Orange, N.J.). Another type of cutter that may be used is the Commitrol cutter produced by Urshel.

The tube 14 may be a steel pipe, for example, having a one and one-half inch internal diameter. The tube 14 may include a funnel shaped portion 60 and a flange 61 at one end and a nozzle 62 at the other end. The flange 61 may be secured to flange 53 of cutter 13 such as by bolts. The tube 14 may be further supported by a bracket 64. The nozzle 62 may simply provide a restrictive orifice. For example, the tube 14 may have an internal diameter of two inches and the nozzle 62 may have a fixed internal diameter of one-half inch. Alternatively the tube 14 may be provided with a variable nozzle. Such a variable nozzle is disclosed and claimed in U.S. Pat. No. 3,707,380.

OPERATION OF THE PRESENT INVENTION

The protein material may be added to the texturizing apparatus 10 such as through the hopper 31. If desired, suitable provision may be made for metering or controlling the amount of feed material passing through hopper 31. The feed material leaving hopper 31 falls through opening 20 in the housing 16 of valve 12 thus being deposited, for example, in pocket 41a as shown in FIG. IV. The valve member 18 may rotate in a clockwise direction such that pocket 41a moves into alignment with pipe 14 and pocket 41b moves into alignment with pipe 26 in FIG. V. At that point, the residual pressure in pipe 14 and the pressure from pipe 26 act on the protein material.

As shown in FIGS. IV–VII, the pockets such as 41a, 42a and 41b, 42b, respectively are spaced sufficiently close to each other that pockets 41b and 42b simultaneously communicate for a time with the steam source 11 such as through pipe 26. Pockets 41a and 42a, likewise simultaneously communicate for a time with the pipe 14. At all times at least one of the sets 41-44 provide an operating fluid passage. In other words, there is constant intercommunication between the steam source 11 and the pipe 14 thus providing a continuous stream of steam through the apparatus 10. Provision of the continuous stream of steam results in continuous maintenance of elevated pressure in the pipe 14 and thus a texturizing environment for protein.

The pressure exerted on the protein material in valve 12 and pipe 14 is sufficient to provide texturization. Good texturization has been obtained at 30 p.s.i.g. and apparently some texturization has been obtained even at 15 p.s.i.g. The pressure will generally be at least 55 p.s.i.g., preferably 80 to 110 p.s.i.g. The pressure exerted through pipe 26 by the fluid source 11 should be enough greater than the back pressure exerted by the pipe 14 that the protein material is rapidly forced through tube or chamber 14 and nozzle 62. Although the present invention has been described with regard to steam, any suitable gaseous fluid may be used. The fluid provided by source 11 may be a fluid with a high heat transfer coefficient such as steam or a mixture of such a fluid with other gaseous fluid, for example, a mixture of steam and air. The temperature of the gaseous fluid is sufficient to provide texturization. The temperature may be at least 250°F. and preferably is at least 300°F.

It is postulated that the texturization takes place immediately upon application of the pressure to the protein material by fluid force from both the steam pipe 26 and the pipe 14. The protein material is then carried by the flow of steam through the cutter 13 which cuts the protein material into substantially uniform pieces which pass through the cutting plate 57 and the nozzle 62. It is believed that the cutting process retards the movement of the protein material through the apparatus 10. Some pressure is lost through the tube 14 and nozzle 62 for an instant following expulsion of the pieces of protein from nozzle 62. However, the proper pressure may be maintained in pipe 14 because of the limited orifice size in nozzle 62. A processing chamber thus is provided including the openings or passageways through valve 12, cutter 13 and tube 14. It has been found that the protein material fails to texturize appreciably if the pressure within the pipe 14 is reduced to below 15 p.s.i.g. The valve member 18 continues to rotate, pocket 41b aligns with exhaust pipe 24 and any residual pressure in pockets 41a, 41b and passageway 41c is relieved. Pocket 43b reaches the feed port and is loaded with material to be texturized. The operational process then continues as described with respect to texturization using the set 41. Texturization takes place using the various other pockets substantially as described with respect to pockets 41a, 41b and 42a, 42b. The valve member 18 may be rotated at any desired speed depending upon such things as the size of the pockets, the number of pockets and the feed rate of protein material.

The present invention may be used in texturizing various materials and using various operating conditions. The untextured protein may be a vegetable protein, such as soybean protein, a protist protein, such as yeast and other microbials, or animal protein, such as casein. The untextured feed material may be a typical defatted oil seed flour such as soybean flour, it may be a concentrate such as a soybean concentrate, or an isolate such as a soybean isolate. A material having a protein content as low as 30 percent (dry weight basis) and as high as 95 percent may be satisfactorily texturized according to the present invention. For most uses of textured protein contemplated by the present invention, the protein content will be at least 50%, preferably about 55 to 75%. The term "percent" means percent by weight unless otherwise specified.

Protein material, having a moisture content as low as 4 to 6 percent and as high as 40 percent by weight, may be texturized according to the present invention. Materials having moisture contents above 40 percent may be texturized according to the present invention; however, they tend to become sticky and difficult to handle. It has been found that increasing moisture content increases texturization. The maximum moisture content is believed to be limited only by the particular texturizing apparatus used. The range of moisture in the feed material is preferably between 10 and 26 percent and generally between 10 and 20 percent.

The maximum pressure used in the present invention is limited only by the particular apparatus used. In carrying out the invention using apparatus substantially like that shown in FIG. 1., pressures typically as high as 140 p.s.i.g. and as low as 15 p.s.i.g. may be used. It has been found that an increase in pressure generally results in an increase in texturization and/or expansion. The preferred pressure conditions of the present invention are at least 25 p.s.i.g., generally at least 55 p.s.i.g., typically 80 to 110 p.s.i.g.

The textured protein of the present invention may be used for the same purposes and in substantially the same manner as previously known types of texturized protein. The protein material, as it comes from the texturizing apparatus, may be impregnated with conventional meat analog serum, typically including binder, flavoring and water, thereby producing a simulated beef chunk or a simulated chicken chunk. The protein material subsequently may be further ground, such as with a Comitrol Cutter, hydrated and mixed with ground beef or pork sausage, thus acting as a meat extender. Alternatively, the texturized material may be finely chopped and impregnated with a conventional meat analog serum, thereby producing a simulated ground beef or simulated ground pork. For example, simulated ground beef may be prepared by mixing, by weight, about 3.5 parts beef tallow, 4.3 parts corn flour, 1.7 parts egg albumin, 1.2 parts brown sugar, 1.2 parts onion powder, 1.0 part salt, 50 parts water, 24 quarts texturized protein material, beef flavoring and sufficient caramel coloring to obtain the desired cooked hamburger color. The mixture may be heated to set the egg albumin.

EXAMPLE

Protein material was processed according to the present invention for purposes of texturing the protein. The apparatus was as previously described and included a fixed nozzle having an opening of 11/16 inch. The untextured protein material was soy flour having a protein content of about 50%. The pressure within pipe 14 was about 110 p.s.i.g. The gaseous fluid was steam at a temperature of about 435°F. The total moisture content of the protein material was raised to about 12%. The protein material was fed to the apparatus at a rate of about 13 pounds per minute. The material leaving the nozzle was well textured. The apparatus operated well and without plugging of the fixed nozzle.

The embodiments of the invention in which an exclusive privilege or property is claimed are defined as follows:

1. In a method for texturizing particulate protein material including feeding the particulate protein material to an elongated pressurized treating chamber, said protein material having a moisture content of between 4 and 40 percent by weight, said chamber having an inlet at one end and an outlet at the other end, said material having sufficient protein content for texturizing, subjecting said particulate material while in said inlet with pressurized fluid from the chamber and subjecting the material to a steam flow from the direction of the inlet into the elongated chamber thereby texturizing said protein material, the steam flow being of sufficient force to propel said material through the elongated chamber and out of the outlet, the pressure in said chamber being at least about 15 p.s.i.g., the steam temperature in said chamber being at least 250°F.; the improvement comprising: the step of cutting said texturized protein material while in said elongated pressurized treating chamber.

2. The method of claim 1 wherein said pressure is at least 55 p.s.i.g.

3. The method of claim 2 wherein the temperature of said steam in said chamber is at least 300°F.

4. The method of claim 3 wherein the protein content is at least 50% by dry weight basis.

5. The method of claim 4 wherein said moisture content is between 6 and 40% by weight.

6. The method of claim 5 wherein said moisture content is between 10 and 26 percent by weight.

7. The method of claim 5 wherein said moisture content is between 10 and 20 percent by weight.

8. The method of claim 1 wherein said pressure is between 80 and 110 p.s.i.g.

* * * * *